United States Patent
Swanson

(12) 
(10) Patent No.: US 6,279,753 B1
(45) Date of Patent: Aug. 28, 2001

(54) COMBINATION DESK LAMP, COMPACT DISC HOLDER, BEVERAGE CUP HOLDER AND DESK ORGANIZER SET

(75) Inventor: Erik A. Swanson, Woodland Hills, CA (US)

(73) Assignee: Lamps Plus, Inc., Chatsworth, CA (US)

( * ) Notice: Subject to any disclaimer, the term of this patent is extended or adjusted under 35 U.S.C. 154(b) by 0 days.

(21) Appl. No.: 09/584,436

(22) Filed: May 31, 2000

(51) Int. Cl.[7] .................................................. A47F 5/00

(52) U.S. Cl. ..................... 211/13.1; 211/1.51; 211/26; 211/40; 211/69.1; 362/154; 362/253; 362/294; 362/414; 362/801; D6/407; D19/77

(58) Field of Search ............................... 211/40, 26, 1.51, 211/69.1, 13.1, 11; D6/407; D19/77; 362/253, 154, 294, 414, 801

(56) References Cited

U.S. PATENT DOCUMENTS

| | | | |
|---|---|---|---|
| D. 177,178 | * | 3/1956 | Heyburn . |
| D. 339,648 | * | 9/1993 | Wen-Yung . |
| D. 349,170 | * | 7/1994 | Lin . |
| D. 367,124 | * | 2/1996 | Sherman . |
| D. 370,285 | * | 5/1996 | Widdup . |
| 5,337,906 | * | 8/1994 | Digiulio ............................. 211/88.01 |
| 5,365,417 | * | 11/1994 | Chen ..................................... 362/154 |
| 5,370,242 | * | 12/1994 | Huang ..................................... 211/40 |
| 5,584,398 | * | 12/1996 | Lin ........................................ 211/40 |

* cited by examiner

Primary Examiner—Robert W. Gibson, Jr.
(74) Attorney, Agent, or Firm—Fulbright & Jaworski L.L.P.

(57) ABSTRACT

A combination desk lamp, compact disc holder, beverage cup holder and desk organizer set includes a hollow base for supporting a desk lighting fixture mounted to the top of the base, an upright compact disc (CD) holder which is glued to the top of the base, a desk organizer and/or a beverage cup holder. The desk organizer includes a pencil holder removably disposed inside a tray which is glued to the top of the base and provided on the inside with a plurality of cone-shaped protuberances for frictional support. The tray may serve also as a beverage cup holder. The CD holder can also be provided with a beverage cup holder which attaches to the top of the CD holder via glue and a leg/aperture coupling. The top of the CD holder beverage cup holder includes a plurality of concentric interspaced raised surfaces to provide frictional support for a beverage cup. The base includes a power switch, a pair of electrical sockets for plugging external electrical equipment, a power cord for connecting to an outside electrical outlet and a pair of telephone jacks for connecting a computer communication interface (e.g. a modem) or a telephone set. The desk lighting fixture includes a hollow support arm which carries internally an electrical extension cord connected to the power cord inside the base and is mounted at one end to the base. A light reflector and a lamp socket are mounted to the other end of the support arm. The lamp socket is mounted inside the light reflector for seating a light bulb. The support arm may be of partially flexible construction to allow three-dimensional adjustment of the lamp socket and the light reflector with respect to the base by the user.

29 Claims, 4 Drawing Sheets

COMBINATION DESK LAMP, COMPACT DISC HOLDER, BEVERAGE CUP HOLDER AND DESK ORGANIZER SET

BACKGROUND OF THE INVENTION

1. Field of the Invention

The present invention relates generally to workstation accessories for desk top use and more particularly to a combination desk lighting fixture, compact disc holder, beverage cup holder and desk organizer set.

2. Prior Art

A variety of workstation accessories for desk top use are available on the market. Typically, a workstation accessory of this type comprises a desk lamp and a desk organizer combination. Other combinations may include a desk lamp and a compact disc holder. None of the known desk top accessories is versatile enough to include more than two or three features at the most. For example, U.S. Pat. No. 5,365,417 to Chen discloses a combination of a lighting fixture and rack which includes a lamp installed on a top portion of a rack having a plurality of ribs juxtapositionally disposed on a right and a left side portion of a central column of the rack for inserting a plurality of compact discs (CDs) or cassette tapes on the ribs of the rack. This combination is limited to two features, namely a CD rack and a lamp.

Similarly, U.S. Pat. No. 5,584,398 to Lin discloses a CD storage rack and lamp assembly including abase, abase covering, four sets of connecting rods connected in series by connectors, a lamp stand connected to the base and the base covering by the connecting rods, a plurality of arms connected between the lamp holder and the lamp stand, and a plurality of CD carrier plates fastened to the connecting rods at different elevations between the lamp stand and the base covering. This combination is also limited to two features and presents a rather complicated structure.

U.S. Pat. No. Des. 367,124 is directed to a two-feature combination, namely a desk lamp and desk top organizer combination in which the organizer also serves as a base for the lamp.

U.S. Pat. No. Des. 349,170 is also directed to a two-feature combination, i.e. a desk lamp and desk top organizer combination.

Therefore, the need arises for a novel workstation accessory combination for desk top use which should be versatile and preferably of a relatively straightforward construction. Such a desk top combination should incorporate a number of functional features to provide desk top illumination, desk organizer, CD holder and beverage cup holder capability. Since workstations nowadays usually contain computers, printers, scanners, telephone sets and the like, the novel desk top workstation combination should also preferably include a telephone/computer communication interface connection capability as well as electrical sockets for convenient plugging of external equipment (printers, scanners, etc.).

SUMMARY OF THE INVENTION

The present invention is directed to a workstation accessory for desk top use comprising in combination a base having means for operatively connecting a telephone set or a computer communication interface, means for operatively connecting external electrical equipment and means for connecting to a power source; a compact disc holder coupled to the base; a desk organizer coupled to the base away from the compact disc holder; and a desk lighting fixture operatively coupled to the base away from the desk organizer and the compact disc holder, the desk lighting fixture adapted for receiving power when the means for connecting to a power source is operational. The means for operatively connecting a telephone set or a computer communication interface includes at least two operatively interconnected telephone jacks disposed on the base. The means for connecting to a power source includes a power cord coupled to the base. The means for operatively connecting external electrical equipment includes at least one electrical socket disposed on the base and operatively connected to the power cord. The desk lighting fixture includes a support arm coupled at one end to the base, a light reflector coupled to the other end of the support arm, a lamp socket operatively coupled to the other end of the support arm inside the light reflector, the support arm adapted to serve as a power conduit to the lamp socket when the power cord is operatively coupled to a power source.

In accordance with one aspect of the present invention, the desk organizer includes a pencil holder and a tray for holding the pencil holder, the tray coupled to the base away from the compact desk holder. The tray includes means for frictionally holding the pencil holder in the tray. The frictional holding means includes a plurality of protuberances in the tray for providing frictional support for the pencil holder.

The present invention is also directed to a workstation accessory for desk top use comprising in combination a base having means for operatively connecting a telephone set or a computer communication interface, means for operatively connecting external electrical equipment and means for connecting to a power source; a compact disc holder coupled to the base; a beverage cup holder coupled to the base away from the compact disc holder; and a desk lighting fixture operatively coupled to the base away from the beverage cup holder and the compact disc holder, the desk lighting fixture adapted for receiving power when the means for connecting to a power source is operational. The means for operatively connecting a telephone set or a computer communication interface includes at least two operatively interconnected telephone jacks disposed on the base. The means for connecting to a power source includes a power cord coupled to the base. The means for operatively connecting external electrical equipment includes at least one electrical socket disposed on the base and operatively connected to the power cord. The desk lighting fixture includes a support arm coupled at one end to the base, a light reflector coupled to the other end of the support arm, a lamp socket operatively coupled to the other end of the support arm inside the light reflector, the support arm adapted to serve as a power conduit to the lamp socket when the power cord is operatively coupled to a power source.

In accordance with another aspect of the present invention, the beverage cup holder includes means for frictionally holding a beverage cup. The frictional holding means includes a plurality of protuberances in the beverage cup holder for providing frictional support for the beverage cup.

The present invention is further directed to a workstation accessory for desk top use comprising in combination a base having means for operatively connecting a telephone set or a computer communication interface, means for operatively connecting external electrical equipment and means for connecting to a power source; a compact disc holder coupled to the base, the compact disc holder having means for holding a beverage cup; a desk organizer coupled to the base away from the compact disc holder; and a desk lighting fixture operatively coupled to the base away from the desk organizer and the compact disc holder, the desk lighting fixture adapted for receiving power when the means for connecting to a power source is operational. The means for operatively connecting a telephone set or a computer communication interface includes at least two operatively interconnected telephone jacks disposed on the base. The means for connecting to a power source includes a power cord coupled to the base. The means for operatively connecting external electrical equipment includes at least one electrical socket disposed on the base and operatively connected to the power cord. The desk lighting fixture includes a support arm coupled at one end to the base, a light reflector coupled to the other end of the support arm, a lamp socket operatively coupled to the other end of the support arm inside the light reflector, the support arm adapted to serve as a power conduit to the lamp socket when the power cord is operatively coupled to a power source. The desk organizer includes a pencil holder and a tray for holding the pencil holder, the tray coupled to the base away from the compact desk holder. The tray includes means for frictionally holding the pencil holder in the tray. The frictional holding means includes a plurality of protuberances in the tray for providing frictional support for the pencil holder. The compact disc holder has a top and a bottom, the bottom coupled to the base.

In accordance with a different aspect of the present invention, the beverage cup holding means includes a beverage cup holder having a top adapted for holding a beverage cup and a bottom coupled to the top of the compact disc holder. The beverage cup holder top includes means for frictionally holding a beverage cup. The frictional holding means includes a plurality of concentric interspaced raised surfaces on the beverage cup holder top for providing frictional support for a beverage cup.

In accordance with a still different aspect of the present invention, the desk top combination includes means for coupling the bottom of the beverage cup holder to the top of the compact disc holder. The coupling means includes a plurality of legs on the bottom of the beverage cup holder for fitting in a plurality of apertures on the top of the compact disc holder, the plurality of legs adapted to fit in the plurality of apertures.

These and other aspects of the present invention will become apparent from a review of the accompanying drawings and the following detailed description of the preferred embodiments of the present invention.

DETAILED DESCRIPTION OF THE PREFERRED EMBODIMENTS

Figure 1:
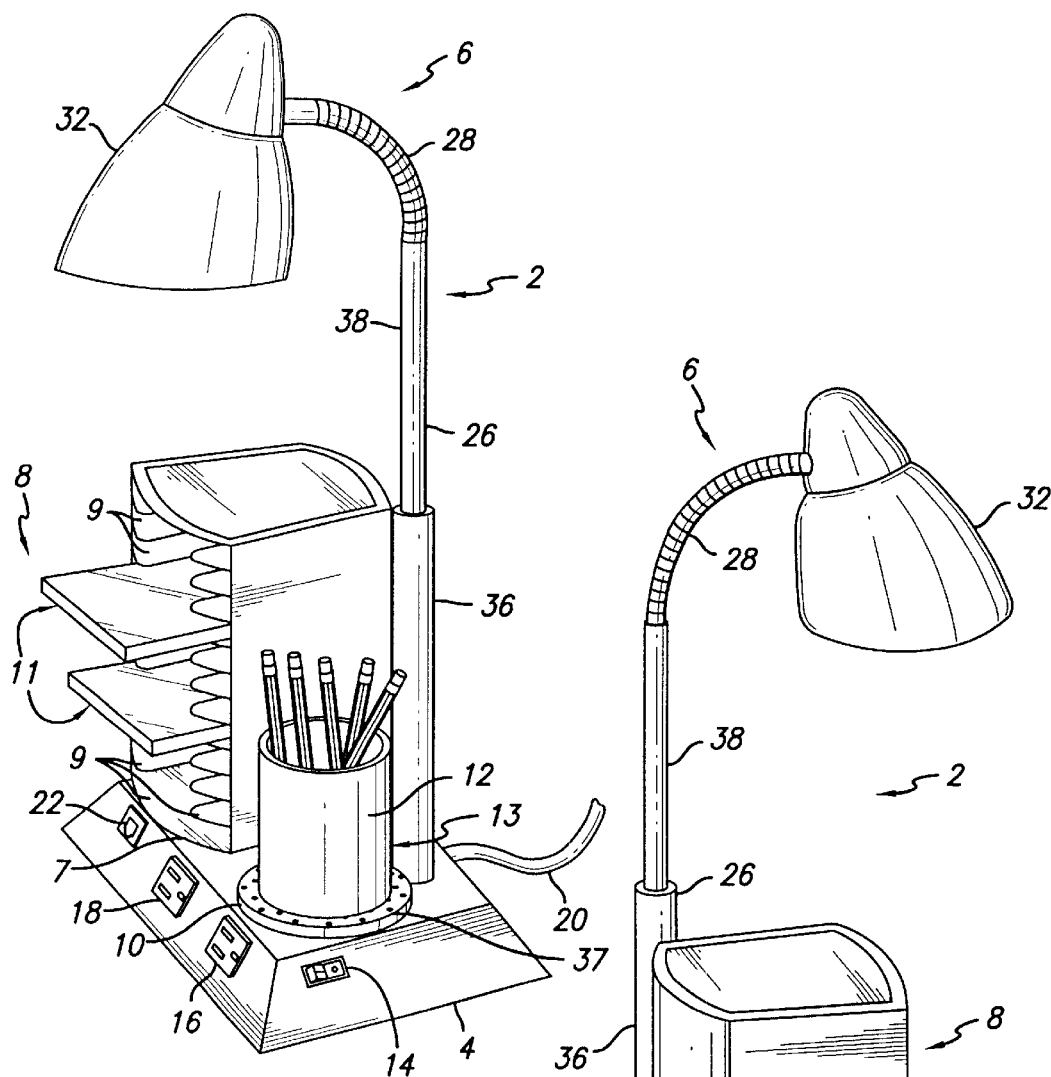
FIG. 1 is a perspective front view of a combination desk lamp, compact disc holder and desk organizer set in accordance with the present invention.

Hereinafter, some preferred embodiments of the present invention will be described in detail with reference to the related drawings of FIGS. 1–8. Additional embodiments, features and/or advantages of the invention will become apparent from the ensuing description or may be learned by the practice of the invention.

In the figures, the drawings are not to scale and reference numerals indicate the various features of the invention, like numerals referring to like features throughout both the drawings and the description.

The following description includes the best mode presently contemplated for carrying out the invention. This description is not to be taken in a limiting sense, but is made merely for the purpose of describing the general principles of the invention.

The present invention is directed generally to a combination desk lamp, compact disc holder, beverage cup holder and desk organizer set for desk top use which may include a hollow base for supporting a desk lighting fixture, an upright CD holder, a desk organizer or a beverage cup holder or both. The compact disc holder and the beverage cup holder are glued to the top of the base. The base includes a power switch, a pair of electrical sockets for plugging external electrical equipment, a power cord for connecting to an outside electrical outlet and a pair of telephone jacks for connecting a computer communication interface or a telephone set. The desk lighting fixture includes a hollow support arm which carries an internal electrical extension cord connected to the power cord inside the base and is mounted at one end to the top of the base. A light reflector is mounted to the other end of the support arm. A lamp socket is also mounted to the other end of the support arm inside the light reflector for seating a standard light bulb. The support arm may be of a partially flexible configuration to allow three-dimensional adjustment of the lamp socket and the light reflector with respect to the base by the user.

Figure 2:
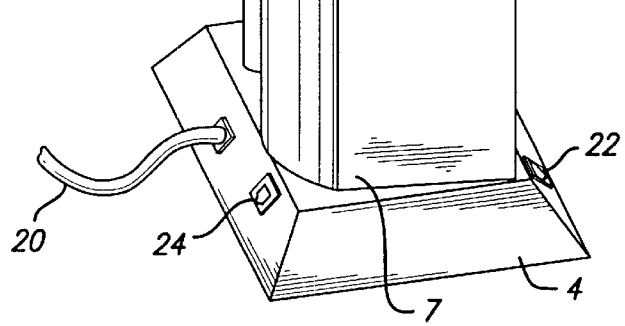
FIG. 2 is a perspective back view of a combination desk lamp, compact disc holder and desk organizer set in accordance with the present invention.

Referring now more particularly to FIG. 1, a workstation accessory for desk top use, generally referred to by reference numeral 2, is shown in accordance with the general principles of the present invention. Desk top workstation accessory 2 comprises in combination a generally hollow base 4 of frusto-pyramidal shape for accommodating electrical and telephone wire connectors and for supporting a desk lighting fixture 6, an upright compact disc holder 8 which is preferably constructed from wood and wire and has a bottom 7 preferably glued to the top of base 4 as shown in FIGS. 1–2 and a plurality of built-in slots 9 for slidably accommodating compact discs (CDs) 11, and a desk organizer 13 which includes a standard cup-shaped pencil holder 12 and a tray 10 for holding pencil holder 12. Tray 10 is preferably provided with a plurality of symmetrically spaced generally cone-shaped solid protuberances 37 (FIG. 1) for providing frictional support for pencil holder 12 and is glued to the top of base 4 as shown in FIG. 1. Other types of desk organizers may be used including integrated desk organizers which may include a pencil holder and the like, provided that such desk organizers do not depart from the intended purpose and scope of the present invention. Tray 10 may also serve as a beverage cup holder. Other methods of attaching tray 10 and bottom 7 of compact disc holder 8 to the top of base 4 may be employed, provided that such methods do not depart from the intended purpose of the present invention. CD holder 8 may be made from other materials as long as such materials are suitable for the intended purpose of the present invention.

Base 4 preferably includes a power switch 14, a pair of electrical sockets 16, 18 for plugging external electrical equipment, a power cord 20 for connecting to an outside electrical outlet and a pair of telephone jacks 22 (FIGS. 1–2) and 24 (FIG. 2) for connecting a computer communication interface (e.g. a modem) (not shown) or a telephone set (not shown). Base 4 is preferably made of sheet metal except for its bottom portion which may be constructed of synthetic rubber or the like to help prevent damage to a desk top support surface.

Desk lighting fixture 6 includes preferably a hollow support arm 26 which carries internally an electrical extension cord (not shown) connected to power cord 20 inside base 4 and is conventionally mounted at one end to the top of base 4 as shown in FIGS. 1–2. Hollow support arm 26 comprises a plastic base arm portion 36, a metal middle arm portion 38 conventionally mounted on top of base arm portion 36 and a flexible arm portion 28 conventionally mounted on top of middle arm portion 38. The support arm (26) of the present invention is not limited to a three-portion construction. Other support arm configurations may be employed as long as such configurations remain within the scope of the present invention.

A generally cone-shaped light reflector 32 is conventionally mounted on the free end of flexible arm portion 28 as shown in FIGS. 1–2. A standard lamp socket (not shown) is also conventionally mounted on the free end of flexible arm portion 28 inside reflector 32 for seating a standard light bulb. Light reflector 32 maybe provided at the lamp socket end with a plurality of vents (not shown) to dissipate heat generated by an operating light bulb. Flexible arm portion 28 is preferably constructed from coiled metallic material to allow three-dimensional adjustment of the lamp socket and reflector 32 with respect to base 4 by the user.

Figure 3:
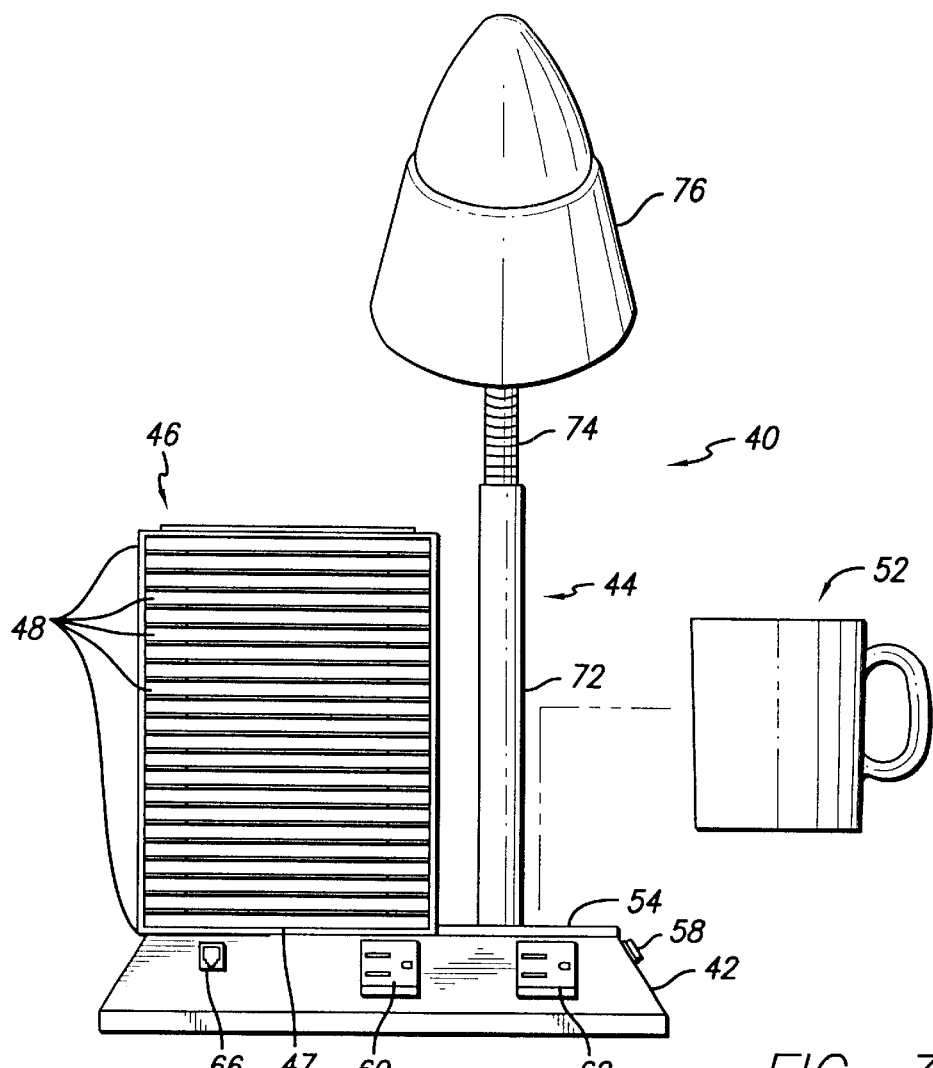
FIG. 3 is a front view of a combination desk lamp, compact disc holder and beverage cup holder set for use in accordance with the present invention.
Figure 4:
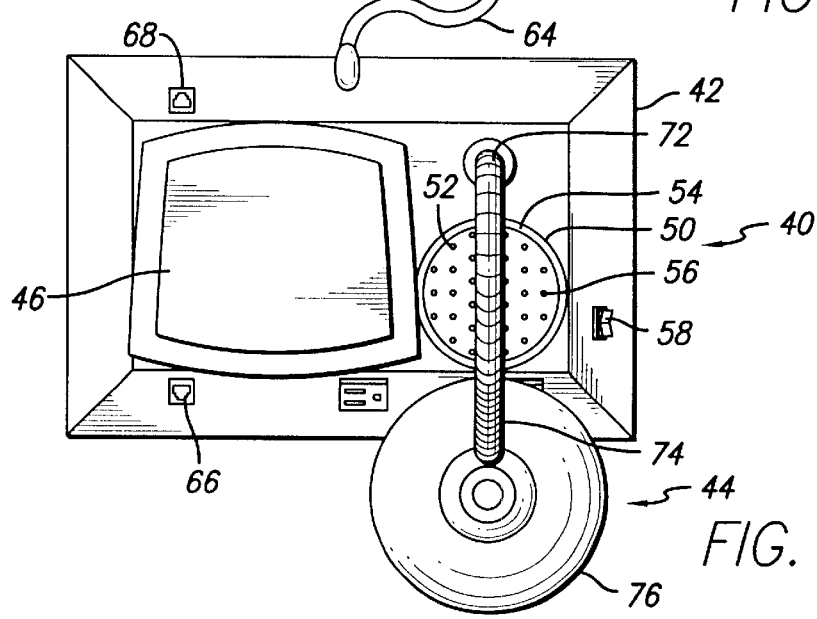
FIG. 4 is a top view of a combination desk lamp, compact disc holder and beverage cup holder set in accordance with the present invention.

FIGS. 3–4 illustrate another preferred embodiment of the present invention. Specifically, a workstation accessory for desk top use, generally referred to by reference numeral 40, is shown in accordance with the general principles of the present invention. Desk top workstation accessory 40 comprises in combination a generally hollow base 42 of frusto-pyramidal shape for accommodating electrical and telephone wire connectors and for supporting a desk lighting fixture 44, an upright compact disc holder 46 which is preferably constructed from wood and wire and has a bottom 47 preferably glued to the top of base 42 as shown in FIGS. 3–4 and a plurality of built-in CD slots 48, and a beverage cup holder 50 (FIG. 4) for holding a beverage cup 52 (FIG. 3). Beverage cup holder 50 includes a generally circular base 52 surrounded by a generally ring-shaped side wall 54 and is preferably made of synthetic rubber or the like. Circular base 52 is preferably provided on the inside with a plurality of symmetrically spaced generally cone-shaped solid protuberances 56 (FIG. 4) for providing frictional support for beverage cup 52 (FIG. 3) and is glued on the outside to the top of base 42 as shown in FIG. 4. Beverage cup holder 50 may also be used to hold a pencil holder. Other methods of attaching beverage cup holder 50 and bottom 47 of compact disc holder 46 to the top of base 42 may be employed, provided such methods do not depart from the intended purpose of the present invention. CD holder 46 may be made from other materials as long as such materials are suitable for the intended purpose of the present invention.

Base 42 preferably includes a power switch 58, a pair of electrical sockets 60, 62 for plugging external electrical equipment, a power cord 64 (FIG. 4) for connecting to an outside electrical outlet and a pair of telephone jacks 66 (FIGS. 3–4) and 68 (FIG. 4) for connecting a computer communication interface (e.g. a modem) (not shown) or a telephone set (not shown). Base 42 is generally of the same construction as base 4 of FIG. 1.

Desk lighting fixture 44 includes preferably a hollow support arm 70 which carries internally an electrical extension cord (not shown) connected to power cord 64 inside base 42 and is conventionally mounted at one end to the top of base 42 as shown in FIGS. 3–4. Hollow support arm 70 comprises a base arm portion 72 and a flexible arm portion 74 conventionally mounted on top of base arm portion 72. Base arm portion 72 may be made of plastic or metal or both, or any other suitable material, while flexible arm portion 74 is generally of the same construction as flexible arm portion 28 of FIG. 1 to allow three-dimensional adjustment of the lamp socket and reflector 76 with respect to base 42 by the user.

A generally cone-shaped light reflector 76 is conventionally mounted on the free end of flexible arm portion 74 as shown in FIGS. 3–4. A standard lamp socket (not shown) is also conventionally mounted on the free end of flexible arm portion 74 inside light reflector 76 for seating a standard light bulb.

Figure 5:
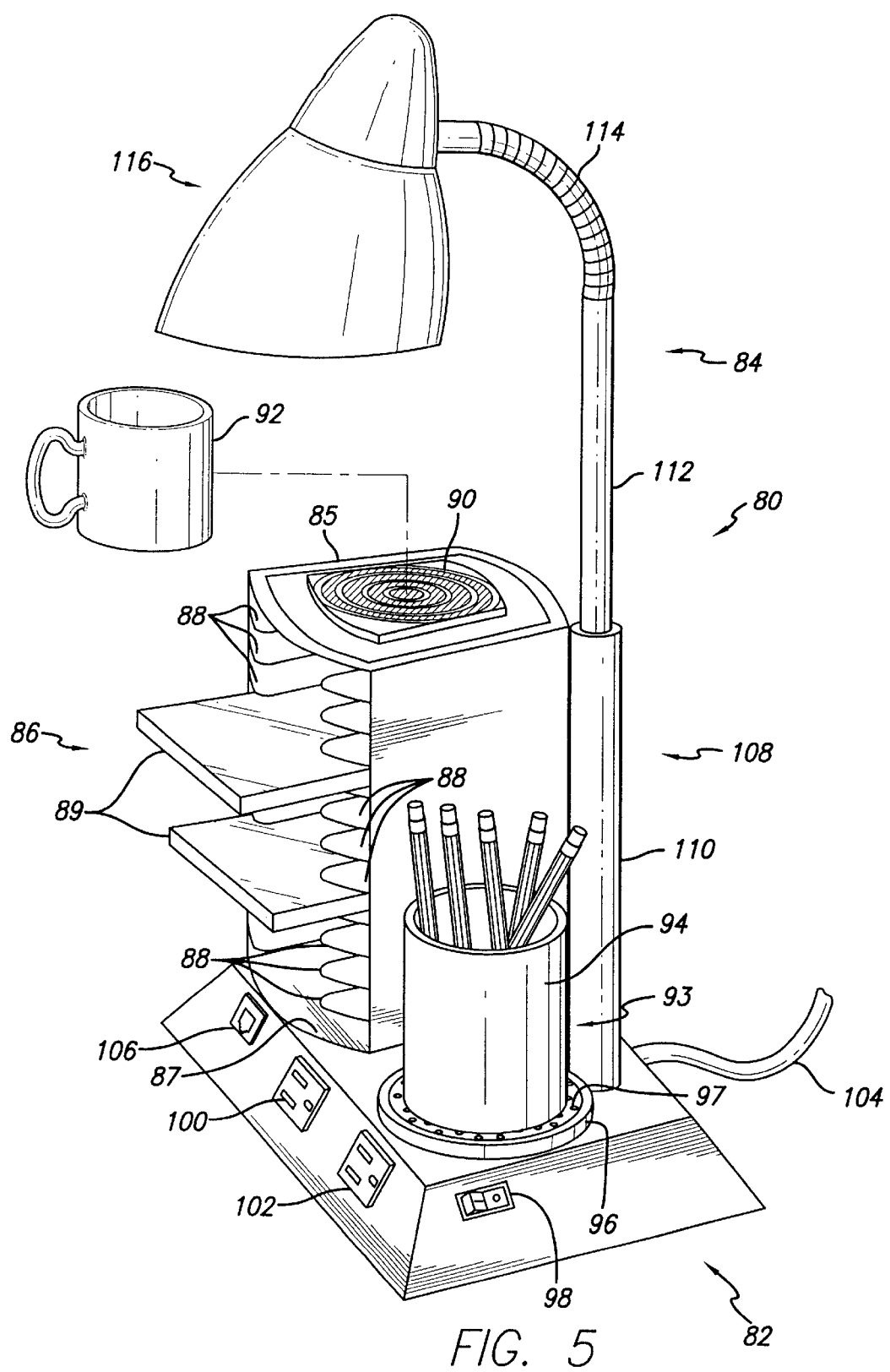
FIG. 5 is a perspective front view of a combination desk lamp, compact disc holder, desk organizer and beverage cup holder set in accordance with the present invention.

FIG. 5 depicts still another preferred embodiment of the present invention. In particular, a workstation accessory for desk top use, generally referred to by reference numeral 80, is shown in accordance with the general principles of the present invention. Desk top workstation accessory 80 comprises in combination a generally hollow base 82 of frusto-pyramidal shape for accommodating electrical and telephone wire connectors and for supporting a desk lighting fixture 84, an upright compact disc holder 86 which is preferably constructed from wood and wire and has a top 85 coupled to a beverage cup holder 90 and a bottom 87 preferably glued to the top of base 82 and a plurality of built-in slots 88 for slidably accommodating compact discs (CDs) 89, and a desk organizer 93 which includes a standard cup-shaped pencil holder 94 and a tray 96 for holding pencil holder 94. Tray 96 is provided on the inside with a plurality of symmetrically spaced generally cone-shaped solid protuberances 97 (FIG. 5) for providing frictional support for pencil holder 94 and is glued on the outside to the top of base 82. Other types of desk organizers may be used including integrated desk organizers which may include a pencil holder and the like, provided that such desk organizers do not depart from the intended purpose and scope of the present invention. Alternatively, tray 96 may be used to hold a beverage cup or the like instead of a pencil holder. Moreover, other methods of attaching tray 96 and bottom 87 of compact disc holder 86 to the top of base 82 may be employed, provided such methods do not depart from the intended purpose of the present invention. CD holder 86 may be made from other materials as long as such materials are suitable for the intended purpose of the present invention.

Base 82 preferably includes a power switch 98, a pair of electrical sockets 100, 102 for plugging external electrical equipment (such as printers, scanners, etc.), a power cord 104 for connecting to an outside electrical outlet and a pair of telephone jacks such as telephonejack 106 (the second telephone jack is not shown) for connecting a computer communication interface (e.g. a modem) (not shown) or a telephone set (not shown). Base 82 is generally of the same construction as base 4 of FIG. 1.

Desk lighting fixture 84 includes preferably a hollow support arm 108 which carries internally an electrical extension cord (not shown) connected to power cord 104 inside base 82 and is conventionally mounted at one end to the top of base 82 as shown in FIG. 5. Hollow support arm 108 comprises a plastic base arm portion 110, a metal middle arm portion 112 conventionally mounted on top of base arm portion 110 and a flexible arm portion 114 conventionally mounted on top of middle arm portion 112. Flexible arm portion 114 is generally of the same construction as flexible arm portion 28 of FIG. 1.

A generally cone-shaped light reflector 116 is mounted on the free end of flexible arm portion 114. A standard lamp socket (not shown) is also mounted on the free end of flexible arm portion 114 inside light reflector 116 for seating a standard light bulb.

Figure 6:
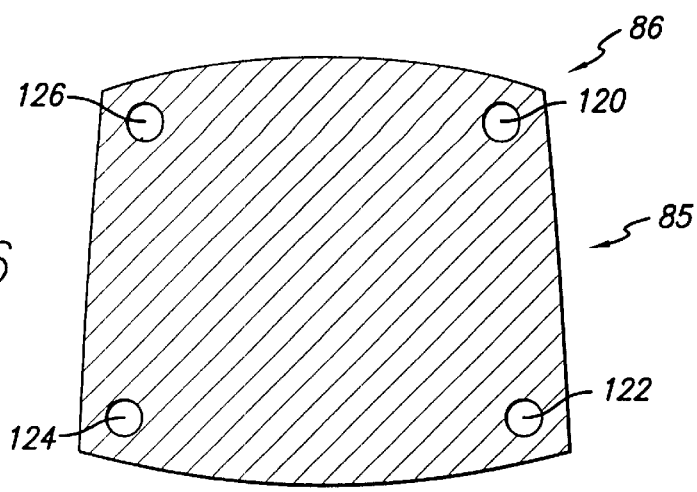
FIG. 6 is a top plan view of a compact disc holder for use in accordance with the present invention.
Figure 7:
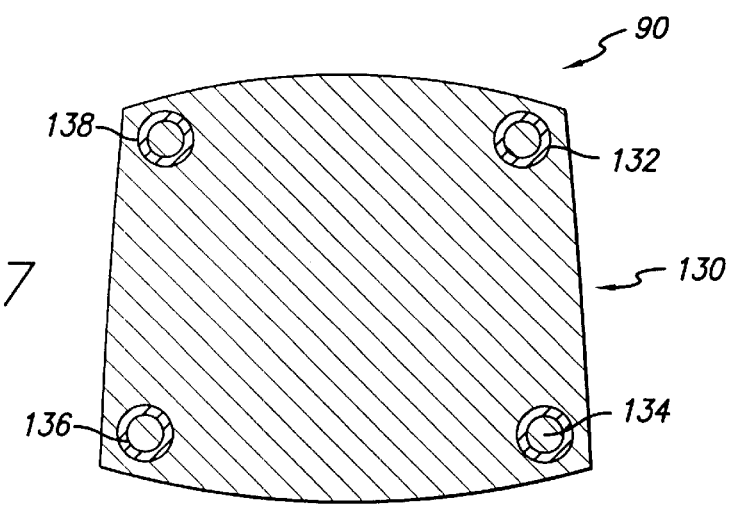
FIG. 7 is a bottom plan view of a beverage cup holder for use in conjunction with the compact disc holder of FIG. 6 in accordance with the present invention.
Figure 8:
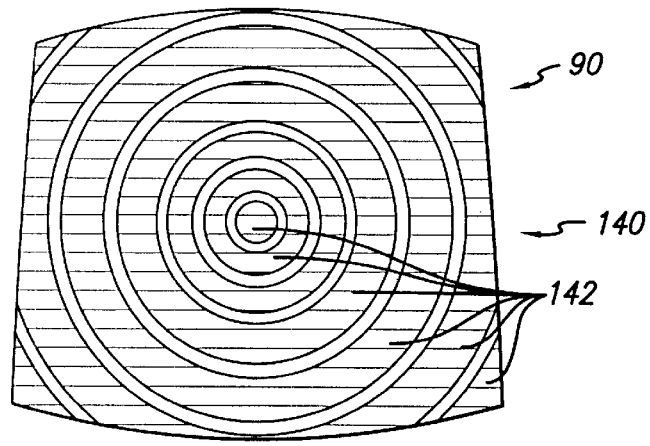
FIG. 8 is a top plan view of the beverage cup holder of FIG. 7 for use in accordance with the present invention.

Turning to FIGS. 6–8, beverage cup holder 90 for use on top 85 of compact disc holder 86 is preferably made of synthetic rubber or the like and has a bottom 130 (FIG. 7) and a top 140 (FIG. 8) generally shaped to follow the contours of top 85 (FIG. 6) of compact disc holder 86. In accordance with the best mode for practicing the present invention, beverage cup holder 90 is permanently attached to top 85 of compact disc holder 86 using glue and a leg/aperture coupling shown in FIGS. 6–7. Specifically, FIG. 7 shows bottom 130 of beverage cup holder 90 having four symmetrically spaced outwardly protruding legs 132, 134, 136 and 138 which are generally ring-shaped. Protruding legs 132, 134, 136 and 138 are preferably fitted in four symmetrically spaced compact disc holder apertures 120, 122, 124 and 126 provided, respectively, on top 85 of compact disc holder 86 (FIG. 6). Before fitting legs 132, 134, 136 and 138 in the respective compact disc holder apertures 120,122,124 and 126, the remaining portion of bottom 130 is substantially covered with glue to help secure bottom 130 of beverage cup holder 90 to top 85 of compact disc holder 86.

Furthermore, and as illustrated in FIG. 8, top 140 of beverage cup holder 90 is preferably provided with a plurality of concentric interspaced generally ring-shaped raised surfaces 142 for providing frictional support for a beverage cup such as beverage cup 92 of FIG. 5. Other types of frictional support may be used on top 140 as long as such other types of frictional support do not depart from the spirit and scope of the present invention.

It should be appreciated by a person skilled in the art that other materials and/or configurations may be utilized in the above-described embodiments, provided that such materials and/or configurations do not depart from the intended purpose of the present invention.

The novel combination desk lamp, compact disc holder, beverage cup holder and desk organizer set is of relatively straightforward construction and is quite versatile in that it may be used in conjunction with a computer, a telephone set and to connect external electrical equipment as needed by the user.

While the present invention has been described in detail with regards to the preferred embodiments, it should be appreciated that various modifications and variations may be made in the present invention without departing from the scope or spirit of the invention. For example, part of the base may be configured as an integral desk organizer to include a pencil holder and various other features. In this regard it is important to note that practicing the invention is not limited to the applications described hereinabove. Many other applications and/or alterations may be utilized provided that they do not depart from the intended purpose of the present invention.

It should be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as they come within the scope of the appended claims and their equivalents.

What is claimed is:

1. A workstation accessory for desk top use comprising in combination:
    (a) a base having means for operatively connecting a telephone set or a computer communication interface, means for operatively connecting external electrical equipment and means for connecting to a power source;
    (b) a compact disc holder coupled to said base;
    (c) a desk organizer coupled to said base away from said compact disc holder; and
    (d) a desk lighting fixture operatively coupled to said base away from said desk organizer and said compact disc holder, said desk lighting fixture adapted for receiving power when said means for connecting to a power source is operational.

2. The combination of claim 1, wherein said means for operatively connecting a telephone set or a computer communication interface includes at least two operatively interconnected telephone jacks disposed on said base.

3. The combination of claim 1, wherein said means for connecting to a power source includes a power cord coupled to said base.

4. The combination of claim 3, wherein said means for operatively connecting external electrical equipment includes at least one electrical socket disposed on said base and operatively connected to said power cord.

5. The combination of claim 3, wherein said desk lighting fixture includes a support arm coupled at one end to said base, a light reflector coupled to the other end of said support arm, a lamp socket operatively coupled to the other end of said support arm inside said light reflector, said support arm adapted to serve as a power conduit to said lamp socket when said power cord is operatively coupled to a power source.

6. The combination of claim 1, wherein said desk organizer includes a pencil holder and a tray for holding said pencil holder, said tray coupled to said base away from said compact desk holder.

7. The combination of claim 6, wherein said tray includes means for frictionally holding said pencil holder in said tray.

8. The combination of claim 7, wherein said frictional holding means includes a plurality of protuberances in said tray for providing frictional support for said pencil holder.

9. A workstation accessory for desk top use comprising in combination:
    (a) a base having means for operatively connecting a telephone set or a computer communication interface, means for operatively connecting external electrical equipment and means for connecting to a power source;
    (b) a compact disc holder coupled to said base;
    (c) a beverage cup holder coupled to said base away from said compact disc holder; and
    (d) a desk lighting fixture operatively coupled to said base away from said beverage cup holder and said compact disc holder, said desk lighting fixture adapted for receiving power when said means for connecting to a power source is operational.

10. The combination of claim 9, wherein said means for operatively connecting a telephone set or a computer communication interface includes at least two operatively interconnected telephone jacks disposed on said base.

11. The combination of claim 9, wherein said means for connecting to a power source includes a power cord coupled to said base.

12. The combination of claim 11, wherein said means for operatively connecting external electrical equipment includes at least one electrical socket disposed on said base and operatively connected to said power cord.

13. The combination of claim 11, wherein said desk lighting fixture includes a support arm coupled at one end to said base, a light reflector coupled to the other end of said support arm, a lamp socket operatively coupled to the other end of said support arm inside said light reflector, said support arm adapted to serve as a power conduit to said lamp socket when said power cord is operatively coupled to a power source.

14. The combination of claim 9, wherein said beverage cup holder includes means for frictionally holding a beverage cup.

15. The combination of claim 14, wherein said frictional holding means includes a plurality of protuberances in said beverage cup holder for providing frictional support for the beverage cup.

16. A workstation accessory for desk top use comprising in combination:
  (a) a base having means for operatively connecting a telephone set or a computer communication interface, means for operatively connecting external electrical equipment and means for connecting to a power source;
  (b) a compact disc holder coupled to said base, said compact disc holder having means for holding a beverage cup;
  (c) a desk organizer coupled to said base away from said compact disc holder; and
  (d) a desk lighting fixture operatively coupled to said base away from said desk organizer and said compact disc holder, said desk lighting fixture adapted for receiving power when said means for connecting to a power source is operational.

17. The combination of claim 16, wherein said means for operatively connecting a telephone set or a computer communication interface includes at least two operatively interconnected telephone jacks disposed on said base.

18. The combination of claim 16, wherein said means for connecting to a power source includes a power cord coupled to said base.

19. The combination of claim 18, wherein said means for operatively connecting external electrical equipment includes at least one electrical socket disposed on said base and operatively connected to said power cord.

20. The combination of claim 18, wherein said desk lighting fixture includes a support arm coupled at one end to said base, a light reflector coupled to the other end of said support arm, a lamp socket operatively coupled to the other end of said support arm inside said light reflector, said support arm adapted to serve as a power conduit to said lamp socket when said power cord is operatively coupled to a power source.

21. The combination of claim 16, wherein said desk organizer includes a pencil holder and a tray for holding said pencil holder, said tray coupled to said base away from said compact desk holder.

22. The combination of claim 21, wherein said tray includes means for frictionally holding said pencil holder in said tray.

23. The combination of claim 22, wherein said frictional holding means includes a plurality of protuberances in said tray for providing frictional support for said pencil holder.

24. The combination of claim 16, wherein said compact disc holder has a top and a bottom, said bottom coupled to said base.

25. The combination of claim 24, wherein said beverage cup holding means includes a beverage cup holder having a top adapted for holding a beverage cup and a bottom coupled to said top of said compact disc holder.

26. The combination of claim 25, wherein said beverage cup holder top includes means for frictionally holding a beverage cup.

27. The combination of claim 26, wherein said frictional holding means includes a plurality of concentric interspaced raised surfaces on said beverage cup holder top for providing frictional support for a beverage cup.

28. The combination of claim 25, further comprising means for coupling said bottom of said beverage cup holder to said top of said compact disc holder.

29. The combination of claim 28, wherein said coupling means includes a plurality of legs on said bottom of said beverage cup holder for fitting in a plurality of apertures on said top of said compact disc holder, said plurality of legs adapted to fit in said plurality of apertures.

\* \* \* \* \*